Sept. 20, 1949.  E. G. MILLER ET AL  2,482,199
MOTOR OPERATED VALVE

Filed Sept. 20, 1943  2 Sheets-Sheet 1

INVENTORS:
EDWARD G. MILLER,
RALPH E. ENGBERG

ATTORNEYS

Sept. 20, 1949. E. G. MILLER ET AL 2,482,199
MOTOR OPERATED VALVE
Filed Sept. 20, 1943 2 Sheets-Sheet 2
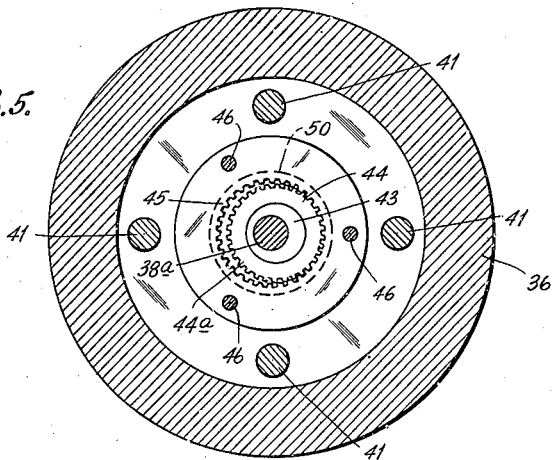
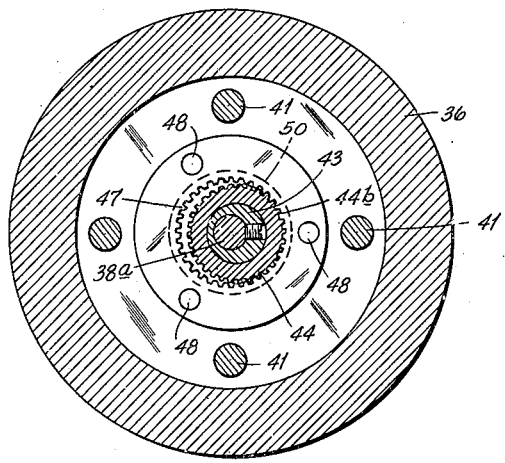
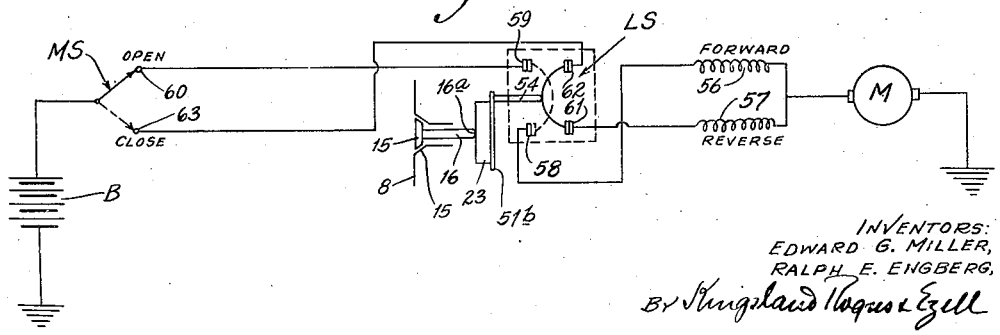
INVENTORS:
EDWARD G. MILLER,
RALPH E. ENGBERG,
By Kingsland Rogers & Ezell
ATTORNEYS Patented Sept. 20, 1949

2,482,199

UNITED STATES PATENT OFFICE 2,482,199

MOTOR OPERATED VALVE

Edward G. Miller and Ralph E. Engberg, Clayton, Mo., assignors to Alco Valve Company, St. Louis, Mo., a corporation of Missouri Application September 20, 1943, Serial No. 503,022

1 Claim. (Cl. 137—139)

The present invention relates generally to motor operated valves. More particularly it relates to a semi-automatic, self-phasing, current unloading valve, which is operated by a motor combined therewith to form a complete and compact unit, efficient and accurate in operation. Novelty of construction, and simplicity of the arrangement whereby the objects of the invention are attained will be hereinafter disclosed.

An object of the invention is the provision of an improved arrangement in a valve of this character, whereby the valve mechanism and its movements are controlled by a prime mover selectively adapted to cause the valve proper to open and to be so maintained, or to close and be so maintained by the simple expedient of shifting a manually operable switch from open to closed position or vice versa.

Another object of the invention resides in the power transmission mechanism interposed between the prime mover and the valve mechanism, whereby the high velocity of the former is greatly reduced before it reaches and operates the latter, resulting in a predetermined speed reduction ratio effecting a substantially improved operating torque therein.

Another object of the invention is the provision of a valve operating mechanism which will act effectively and positively against various inlet pressures ranging up to approximately seven hundred pounds, and which is designed to automatically lock the valve proper in either the open or closed position thereof for any selected period of time.

A further object consists in providing a simple yet positive sealing means whereby the fluid agent entering and discharging from the valve is definitely segregated from the mechanism which controls its action.

Additional advantages of the invention will be pointed out, or are apparent from the following detailed description taken in connection with the accompanying drawings. In said drawings which illustrate a preferred embodiment of my invention:

Figure 4:
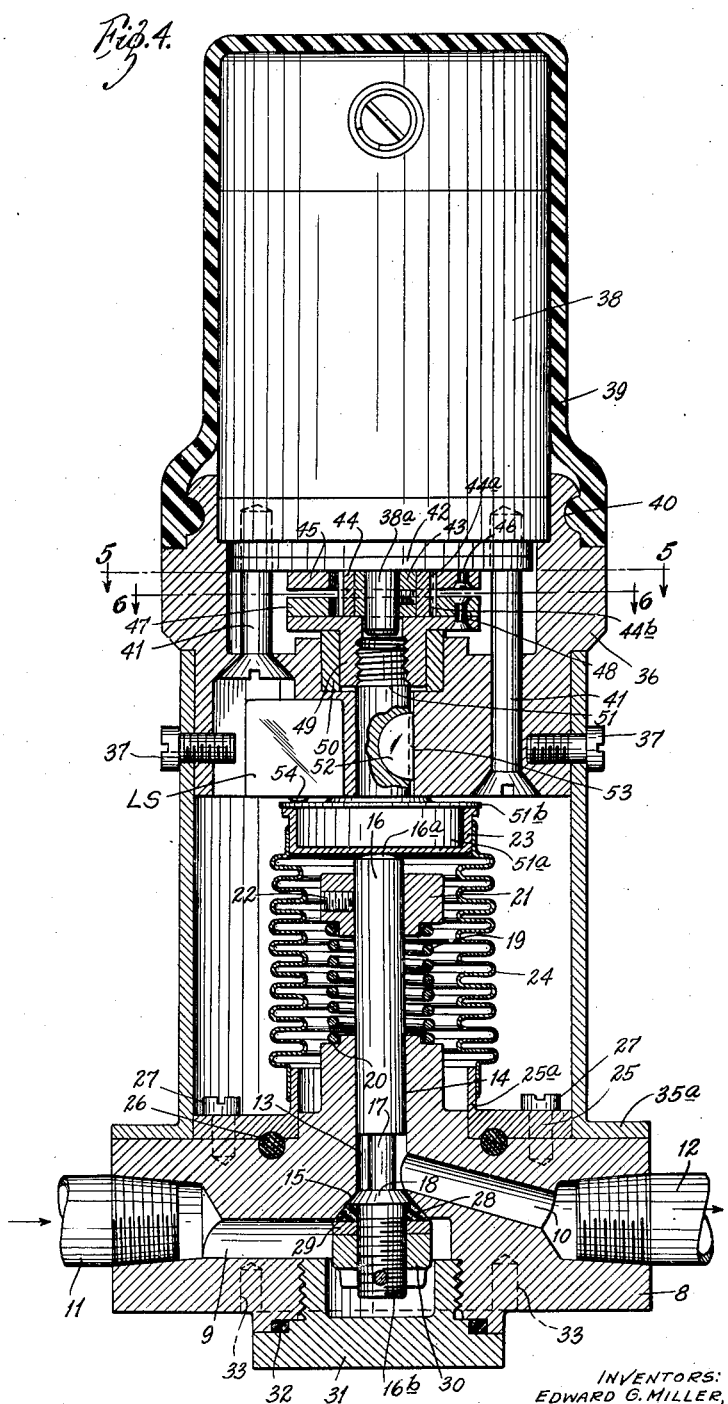
Fig. 4 is a vertical sectional view taken approximately along the line 4—4 in Fig. 1.

Figs. 5 and 6 are horizontal sectional views taken respectively on lines 5—5 and 6—6 across the middle of Fig. 4; and, Fig. 7 is a diagram illustrating the wiring arrangement employed in achieving the invention.

The device is portrayed in a vertical position, but may obviously be utilized in a horizontal or an angular position with equal efficiency.

The embodiment illustrated includes a valve body 8, having formed therein an inlet passage 9 and an outlet passage 10 in communication respectively with inlet and outlet conduits 11 and 12. Fluid communication between said inlet and outlet passages may be had when the valve is open (it is shown closed in the drawings), through that portion 13 of a central bore 14 contiguous to a valve seat 15 formed in the valve body.

A poppet valve stem 16, reciprocable in said bore, has a reduced portion 17 terminating in a conical valve element or plug 18, which in the closed position thereof is maintained firmly against the conical seat 15 by the action of an expansible coil spring 19, extending between a seat 20 on the valve body and the underside of a spring retainer 21 fixed to the upper portion of the stem, as shown in Fig. 4, by means of a set screw 22, such arrangement providing for adjustment of spring tension as is obvious. The poppet valve is arranged so that seating is improved by being aided by inlet pressure.

In addition to seating the valve head 18, the spring 19 also maintains the upper extremity 16a of the poppet valve stem in constant contact with the underside of a pan-shaped member or disc 23 to which is welded or otherwise hermetically secured the upper end of a bellows 24 whose lower end is similarly secured to a cylindrical tubular portion 25a of a circular bellows support 25.

As shown in Fig. 4, an annular gasket 26 of synthetic rubber or similar material occupies corresponding grooves formed in the under and upper faces of the bellows support 25 and the valve body 8, respectively, thus effecting a seal therebetween. Screws 27 or other fasteners are employed to attach the bellows supporting element 25 to the valve body. The above-described bellows construction provides a seal between the fluid area of the valve and the operating mechanism therefor hereinafter to be described.

Figure 1:
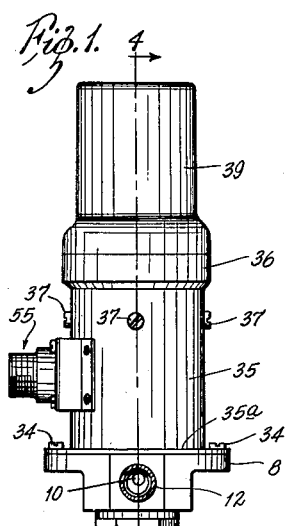
Fig. 1 is a side elevational view thereof.
Figure 2:
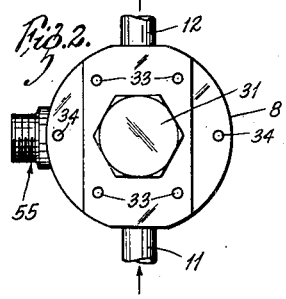
Fig. 2 is a bottom view of Fig. 1.
Figure 3:
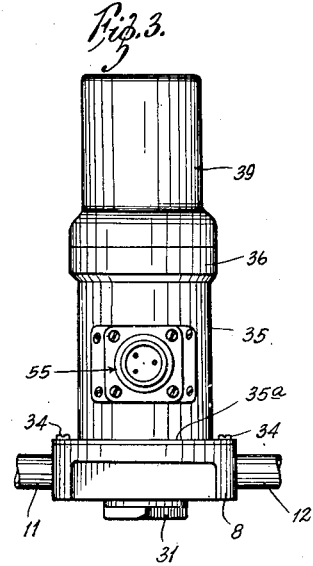
Fig. 3 is a side elevational view of the unit as it appears from the left in Fig. 1.

A conical seal 28 of synthetic semi-rigid material is sleeved on a threaded depending portion 16b of the poppet valve stem, and by means of a lock washer 29 and nut 30 is held in place firmly against the valve plug 18, so that a tight seal is provided in the closed position of the valve as is understood. Access to these parts may be had by removal of the body plug 31. A suitable gasket 32 prevents leakage during operation. The valve body is provided with tapped openings 33 (Figs. 2 and 4), which may be utilized in attaching the unit to a support.

Mounted on the valve body 8 as by screws 34 passing through a flanged portion 35a thereof is a bellows housing or cylinder 35. Secured to and supported by the upper portion of the bellows housing is a switch housing 36 rigidly maintained in position by screws 37.

A reversible motor M, the casing of which is designated 38, rests on and is supported by said switch housing as illustrated, rigidity thereof being insured by means of a snugly fitting moisture proofing cover 39 of yieldable insulating material which has an interlocking connection as at 40 with said housing. A plurality of screws 41 hold the motor on the switch housing 36, the motor housing interfitting with the switch housing as shown. The motor shaft 38a extends beyond the casing 38 and also through and beyond a gear plate 42 rigidly attached to the casing. An eccentric 43 is secured to the shaft and rotates therewith. A double pinion 44 is mounted around the eccentric 43 and may revolve thereabout when the motor shaft rotates the eccentric.

The double pinion comprises a first gear 44a and a second gear 44b, and constitutes the driving component of an epicyclic gear train which also includes a pair of spaced ring gears.

Thus, a first ring gear 45 is secured to the fixed gear plate 42 by screws 46, and is in mesh with a segment of the smaller gear 44a of the double pinion 44. A second ring gear 47 is in similar engagement with the gear 44b of the double pinion 44, but unlike the stationary gear 45, is movable and constitutes the driven member of the epicyclic train. It is driven at a greatly reduced speed relative to that of the motor shaft 41.

In order to clarify the manner in which such speed reduction is obtained, attention is directed to Figs. 5 and 6. It is seen that when the eccentric 43 is rotated by the motor shaft 38a, the double pinion 44 will revolve thereabout. As shown in Patent No. 2,370,872, applied for by applicants herein, the epicyclic reduction is obtained by having a smaller number of teeth on pinion 44a than on ring gear 45, and by having a smaller number of teeth on pinion 44b than on ring gear 47. To illustrate, if the ring gear 45 has 25 teeth, the pinion 44a has 24 teeth, the pinion 44b has 25 teeth, and the ring gear 47 has 26 teeth, a 624:1 reduction is obtained.

This rotation obviously is transmitted to the gear 44b which, as shown, is integral with gear 44a, and in mesh with the rotatable internal ring gear 47, to which is secured by rivets 48, or other means, a rotatable internally threaded nut 49 mounted in and supported by a suitable bearing sleeve 50.

A jack-screw 51 whose upper end portion is externally threaded and in engagement with the internal threads of the nut 49, has its opposite or head end 51a disposed in contact with the member 23, in turn in contact with the poppet stem 16 as hereinbefore noted. The jack-screw 51 may have vertically reciprocal movements in the switch housing 36, imparted thereto by the rotatable nut 49, but is itself non-rotatable therein, since a key 52 slidable in a groove 53 and partially imbedded in the jack-screw is the preventive agent.

It should now be apparent that rotation of the nut 49 in one direction will unseat the valve head 15, while rotation thereof in the opposite direction will effect seating of the same. The jackscrew head portion 51a is enlarged so that smooth contraction and expansion of the bellows 24 may be had.

As shown in Fig. 4, and illustrated diagrammatically in Fig. 7, the jack-screw head 51a is provided with an annular flange 51b in contact with, and controlling the action of, a double pole single throw snap-action limit switch button or actuating component 54. This limit switch, designated LS in the drawings, is of a commercial type and therefore is illustrated only diagrammatically in Fig. 7. It is mounted in the switch housing 36 as portrayed in Fig. 4.

An appropriate connector for the electrical wiring is indicated 55, and a typical circuit of said wiring for the present valve construction is shown in Fig. 7.

With particular reference now to Fig. 7, the motor M is seen to have a forward winding 56 and a reverse winding 57. The winding 56 is connected to a contact 58, the circuit of which may be completed through another contact 59 that is in connection with one terminal 60 of a master switch MS. In turn, the master switch is connected to a battery B. The circuit may be completed through the ground.

The winding 57 is connected to a contact 61, and its circuit may be completed through another contact 62 connected to the other terminal 63 of the master switch. When the valve opens, the limit switch actuating member 54 is shifted from a position wherein it closes the contacts 58 and 59 to a position wherein it closes the contacts 61 and 62. When the valve closes, the member 54 opens the contacts 61 and 62 and closes the contacts 58 and 59.

Operation

Let it be assumed that the inlet pipe 11 originates at a reservoir, and that a predetermined quantity of the liquid there stored is to be delivered to the outlet pipe 12.

Let it also be assumed that the valve is in its closed Fig. 4 position. At such time the limit switch contacts 58 and 59 are closed and the master switch is in contact with terminal 63, as indicated in broken lines in Fig. 7. All of the elements of the unit, including the motor and its shaft, are idle.

In order to open the valve, the master switch is moved to contact the terminal 60, thereby completing a circuit through said contacts and the forward winding 56 of the motor. Thereupon the motor rotates the eccentric 43 in a clockwise direction. Consequently, the nut 49 is also rotated in a clockwise direction, although as noted, at a greatly reduced rate of speed because of the epicyclic gear train, through which the power is transmitted.

As the nut 49 rotates, the jack-screw descends gradually, thereby unseating the valve 15, and permitting the fluid under pressure to pass from the inlet passage 9 to the outlet passage 10 via chamber 13. In the closed position of the valve, the jack-screw flange 51b maintains the limit switch actuating member 54 in compressed position. Movement of the jack-screw to the completely open position of the valve, releases the actuating member 54 thereby causing the limit switch contacts associated therewith to snap out of engagement with the contacts 58 and 59, and into engagement with contacts 61 and 62, thereby shutting off the power supply to the motor, as is well understood, and presetting the limit switch for a valve-closing operation.

Assuming now that a required quantity of liquid has passed through the valve, and it is desired to shut off the supply, the master switch MS is moved to contact the terminal 63. This completes a circuit through the contacts 61, 62 and the reverse winding 57 causing the motor shaft 38a to rotate in a counterclockwise direction. It follows that the eccentric 43 and the nut 49, rotating also in a counterclockwise direction will firmly seat the valve plug 15 and move the limit switch actuating button 54 to its compressed position, thereby shutting off the power supply to the motor and presetting the electrical circuit for a repetition of the cycle.

The limit switch in this case is one of the well-known types having a negative differential, by which it shifts in a closing position when the valve is just closed, and shifts open when the valve is completely open.

The valve may lock in closed position because the head 51a may withdraw slightly from the pan-shaped element 23 before the motor shaft stops. This permits the valve to be seated by the full force of the spring 20, without interfering with automatic operation to open the valve later, as the parts merely come together again. This separation does not interfere with the seal of the valve itself produced by the bellows arrangement.

The valve is self-phasing, as the limit switch is always in a position corresponding to that of the valve. Hence manual operation (as by turning the motor shaft by hand) does not upset the automatic operation.

The valve assembly is in separable units. The motor can be withdrawn. The switch mechanism can be withdrawn from the valve, without upsetting the valve seal, and with it operating to safe, closed position.

What is claimed is:

In a valve mechanism, a reversible motor having a projecting shaft, valve elements including a valve housing, an inlet passageway, an axial bore having a valve seat, and an outlet passageway formed therein, a poppet valve stem slidable in the axial bore, a valve head provided with sealing means formed adjacent a reduced portion of the valve stem, a chamber formed in said bore by the reduced portion of the stem, an expansible spring arrangement normally maintaining the valve head seated against the valve seat, a bellows assembly for hermetically sealing the aforesaid valve elements from the remainder of the mechanism, a cylindrical shell mounted on the valve housing in spaced relation to the bellows, a member provided with an axial bore and being mounted on and supported by said valve housing, a jack-screw axially slidable but non-rotatable in the bore, an enlarged head portion of the jack-screw being in contact with the upper end of the poppet stem, a rotatable nut engaging an externally threaded portion of the jack-screw for reciprocating the latter axially to seat or unseat the valve head, and a power transmission means including an epicyclic gear train interposed between the motor shaft and the rotatable nut, whereby the latter is driven at a greatly reduced speed by said motor.

EDWARD G. MILLER.
RALPH E. ENGBERG.

REFERENCES CITED

The following references are of record in the file of this patent:

UNITED STATES PATENTS

| Number | Name | Date |
| --- | --- | --- |
| 1,141,647 | Merk | June 1, 1915 |
| 1,173,764 | Baldwin | Feb. 29, 1916 |
| 1,777,115 | Bruback | Sept. 30, 1930 |
| 1,791,012 | Ray | Feb. 3, 1931 |
| 1,807,302 | Braden | May 26, 1931 |
| 1,977,015 | Rodler | Oct. 16, 1934 |
| 1,989,942 | Parks | Feb. 5, 1935 |
| 1,992,902 | McIntosh | Feb. 26, 1935 |
| 2,334,513 | Shaw | Nov. 16, 1943 |